United States Patent [19]
Dodds et al.

[11] Patent Number: 5,326,142
[45] Date of Patent: Jul. 5, 1994

[54] TRUCK WITH BRUSH/GRILL GUARD, SLANTED TUBULAR BUMPER, RALLY BAR AND RALLY BAR LIGHTS

[75] Inventors: David C. Dodds, Mason, Ohio; Ned J. Hart, Southfield; Michael C. Allen, Royal Oak, both of Mich.

[73] Assignee: Ford Motor Company, Dearborn, Mich.

[21] Appl. No.: 114,883

[22] Filed: Aug. 31, 1993

[51] Int. Cl.⁵ .............................................. B60R 19/52
[52] U.S. Cl. .................................. 293/115; 293/155; 180/68.6
[58] Field of Search ............... 293/115, 155, 142–144; 180/68.6; 280/502; 248/228, 231.6; 224/42.03 R, 42.03 A, 42.03 B

[56] References Cited

U.S. PATENT DOCUMENTS 2,100,018 11/1937 Weasler et al. ................... 293/115
2,108,119  2/1938 Gould ................................ 293/143
2,189,169  2/1940 Cox .

OTHER PUBLICATIONS

Automotive News, May 25, 1992, p. 2.

*Primary Examiner*—Dennis H. Pedder
*Attorney, Agent, or Firm*—Daniel M. Stock; Peter Abolins

[57] ABSTRACT

Accessories for a pickup truck includes a front brush/-grill guard, a tubular rear bumper and a rally bar with lights. The brush guard has upper and lower flanges and offset front and rear mounting brackets which sandwich the flanges therebetween to fasten the guard on the front bumper of the truck. The rear bumper assembly has first and second tubes with angled end portions which angle inward toward the truck body. The ends of the tubes are parallel to the truck body for aesthetic appeal. The tubes provide a license plate mounting area and are mounted using large and small bumper tabs, a frame bracket and a tube bracket. The rally bar assembly includes front and rear rally bars releasably connected by a two member bracket. The bracket has a front member fastened to the front bar and a rear member connected to the rear bar. The bracket also supports a light assembly for projecting light forward of the vehicle.

20 Claims, 7 Drawing Sheets

TRUCK WITH BRUSH/GRILL GUARD, SLANTED TUBULAR BUMPER, RALLY BAR AND RALLY BAR LIGHTS

FIELD OF THE INVENTION

The present invention relates generally to a truck, and, more particularly, to accessory equipment for a pickup truck, such as grills, rear bumpers and rally bars.

BACKGROUND OF THE INVENTION

At the time of an automotive purchase the consumer makes selections from a number of factory installed items to fulfill particular needs or desires. Because consumer's desires vary so widely, there are a number of accessories that can be purchased to be installed by vehicle dealers or, in some instances, by the consumer. Pickup trucks are popular vehicles which may be outfitted with various accessories. One such accessory is a front bumper accessory that attaches to the front of the truck for aesthetic appeal or may serve a utilitarian function, such as protecting the bumper, grill or hood of the truck from damage by debris, bugs and insects. Because the front of the vehicle provides headlights and a hood for access to the engine, any accessory added to the front must be carefully designed and installed so that it does not interfere with the operation of the hood or headlights. Accordingly, it is desirable to have a front bumper accessory which is easy to install and align so that it does not hinder operation of the hood or headlights. It is also desirable to have a front bumper accessory which can attach to several different models of bumpers.

Another accessory for a pickup truck is a rally bar. The rally bar is mounted behind the cab of the truck in the truck bed and may provide light fixtures that project light forward of the truck. An advantage of the lights is that they are at a higher elevation than the headlights and may project a beam of light a greater distance and at a higher elevation. Such higher elevation is very useful for illuminating trees and other vegetation during offroad vehicle use. While it is desired to have the rally lights extend above the top of the cab, it is also desirable to have the rally bar which supports the lights unobtrusive and aesthetically pleasing. One problem with rally bars is that a set of rally bars is usually designed for a particular truck bed making it necessary for a dealer to carry a large inventory. Accordingly, it is highly desirable to have rally bars which are adaptable to more than one truck bed.

Another truck accessory is rear bumper. It is desirable for a rear bumper to be easy to install and align so that it does not hinder operation of the tailgate of the truck. It is also desirable to have an aesthetically attractive bumper.

SUMMARY OF THE INVENTION

The present invention is directed to overcoming one or more of the problems set forth above. Briefly summarized, according to one aspect of the present invention, an accessory guard assembly is provided for a truck. The truck has a body, a front bumper with a front surface, an upwardly extending lower flange positioned between the front surface and the body, and a downwardly extending upper flange positioned between the front surface and the body. The guard assembly comprises a brush guard having an upper flange with an opening and a lower flange with an opening, a front mounting bracket and a rear mounting bracket. The front mounting bracket has an upper end portion with an opening and is positionable between the upper flange and the front surface, and the front mounting bracket also a lower end portion with an opening and is positionable between the lower flange and the front surface. The rear mounting bracket has an upper end portion with an opening, a lower end portion with an opening and a middle portion intermediate the upper and lower end portions. The middle portion has an upper opening alignable with the opening of the upper end portion of the front mounting bracket and a lower opening alignable with the opening of the lower end portion of the front mounting bracket to thereby sandwich the upper and lower flanges between the front and rear mounting brackets. The upper and lower end portion openings are respectively alignable with the upper and lower flange openings of the brush guard for mounting the brush guard on the rear bracket.

The assembly for protecting the grill and truck front from brush and other debris quickly attaches to the truck with the offset brackets. The brackets have offset portions for easily adapting to the contour off the front bumper thereby compensating for variations in bumpers of the same type and for different types bumpers. Mounting holes and slots facilitate vertical and horizontal alignment of the brush guard assembly thereby preventing interference with the hood and headlights. When installed, the mounting bracket are hidden from view enhancing the appearance of the brush/grill guard assembly.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
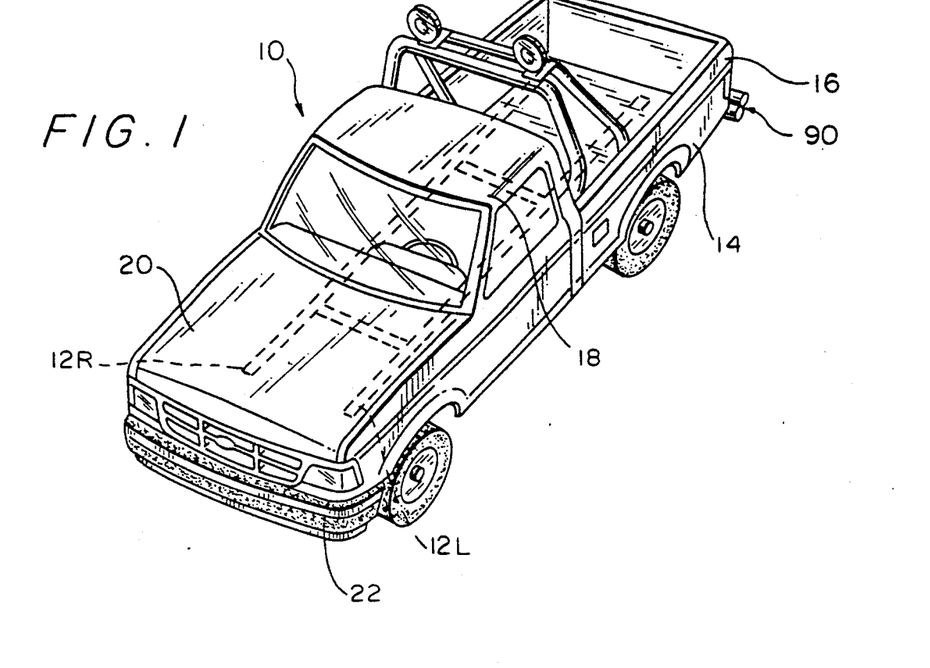
FIG. 1 diagrammatic perspective view of a pickup truck.

Referring to FIG. 1, a vehicle, such as a pickup truck 10, has a longitudinally extending frame 12. Typically, the frame 12 is generally H-shaped with a left frame member 12L and a right frame member 12R, each of which may be a steel beam in the shape of an I or C or a box as is known in the art. The truck 10 has a body 14 mounted on the frame 12. Truck body 14 includes a truck bed 16, a cab 18 and a hood 20.

Figure 2:
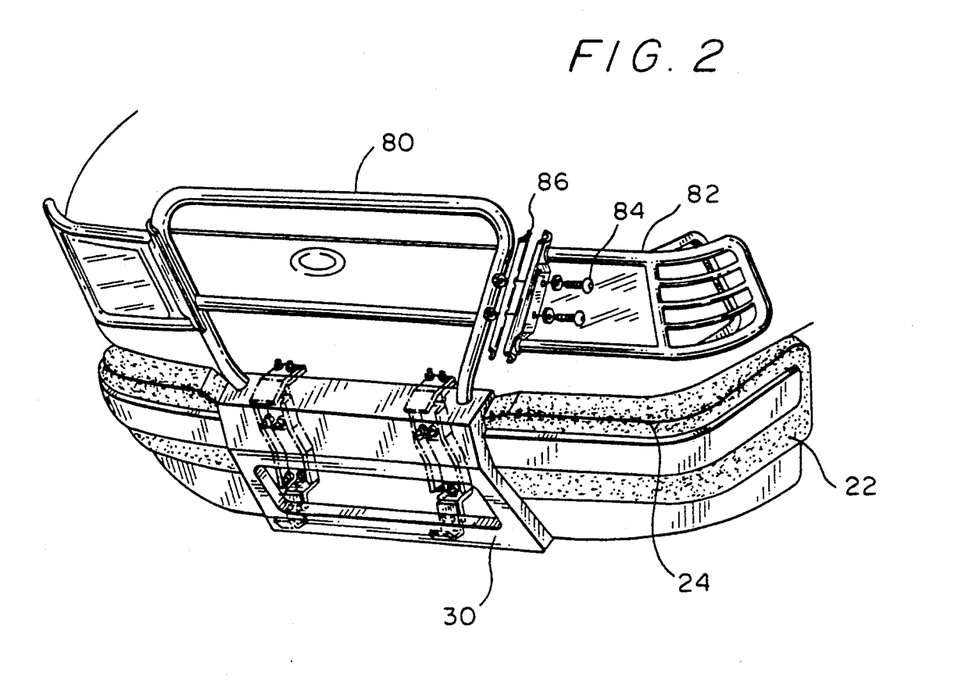
FIG. 2 is perspective view of the pickup truck of FIG. 1 illustrating a preferred embodiment of a grill and brush guard assembly according to the present invention.
Figure 3:
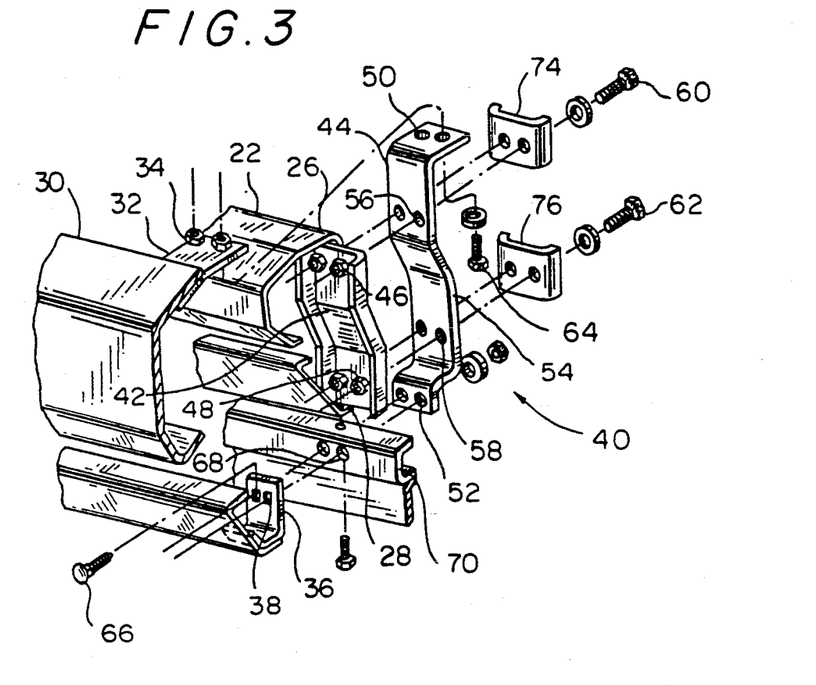
FIG. 3 is an exploded view of a bracket assembly for mounting the guard assembly.

Referring to FIGS. 2-3, a front bumper 22 is fastened to the truck frame 12 and includes a front surface 24 and upper and lower flanges 26, 28. The upper flange 26 extends downwardly between the front surface 24 of the bumper 22 and the truck body 14 so that the front bumper 22 is forward of the cab 18 and hood 20. The lower flange 28 extends upwardly and is also positioned between the front surface 24 and the truck body 14 but is at a lower elevation than the upper flange 26. The flanges 26, 28 extend toward one another giving the front bumper 22 a general C cross section. The ends of the C may or may not lie in a vertical line—the present invention adapts to either configuration.

A brush/grill guard 30 is attached to the front bumper 22 of the truck to protect the front grill and headlights from damage from brush and other debris, particularly when the truck is used in offroad applications. The brush guard 30 has an upper flange 32 with a first opening 34, and a lower flange 36 with a first opening 38. The upper and lower brush guard flanges 32, 36 may be integrally formed with the brush guard 30, but are preferably separate items permanently fastened to the brush guard 30 by welding or the like. Separate items are advantageous for adding strength without significantly adding to the vehicle weight. The upper brush guard flange 32 preferably has first and second portions forming an interior angle of about 140 to 180 degrees.

The brush guard 30 is mounted on the front bumper 22 with a bracket assembly 40 which includes a front mounting bracket 42 and a rear mounting bracket 44. The front mounting bracket 42 has an upper end portion with a first opening 46 while the lower end portion has a first opening 48. The front mounting bracket 42 is configured so that the lower end portion is offset from the upper end portion to better contact the upper and lower flanges 26, 28 which may be offset along a vertical line one from the other. The front mounting bracket 42 is installed inside the C-shaped front bumper 22 so that the upper end portion of the bracket 42 contacts the upper flange 26 and the lower end portion of the bracket 42 contacts the lower flange 28 without the flanges 26, 28 interfering with the openings 46, 48 of the bracket 42. In addition to having the end portions offset from one another, the front mounting bracket 42 preferably has a C-shaped or U-shaped cross section which helps strengthen the bracket 42.

The rear mounting bracket 44 has an upper end portion with a first opening, preferably a slot 50, a lower end portion with an opening 52, and a middle portion 54 that is intermediate the upper and lower end portions and has a first upper opening 56 and a first lower opening 58 therein. The middle portion 54 has an offset so that when the front bracket 42 and rear bracket 44 are adjacent, the upper openings 46, 56 are aligned and the lower openings 48, 58 are also aligned. When installed and connected by an upper bolt 60 extending through openings 46 and 56 and by a lower bolt 62 extending through openings 58 and 48, the front and rear mounting brackets 42, 44 sandwich the upper and lower flanges 26, 28 therebetween. The offset helps compensate for manufacturing differences between bumpers and bumpers of differing types or models.

The upper end portion of the rear mounting bracket 44 is bent backward towards the truck body 14 at an angle of about 90° or so causing the slot 50 to extend horizontally and open vertically for receiving a bolt 64 which also extends through the first opening 34 of the upper flange 32 of the brush guard 30. By this construction, the slot 50 facilitates horizontal positioning of the brush guard 30, and the bracket angle and flange angle facilitate vertical positioning of the brush guard 30 so that the brush guard may be aligned to cooperate with the hood and headlights of the truck.

A bolt 66 extends through opening 38 of lower flange 36, opening 68 in valence 70 attached to front bumper 22 and through opening 52 in the lower end portion of rear mounting bracket 44. Preferably, the bolt 66 has a shoulder adjacent the head with a square or polygonal configuration that mates with the opening 38 which is similarly configured so that the bolt 66 will not turn thereby facilitating fastening of the flange 36 to the rear bracket 44.

Figure 4:
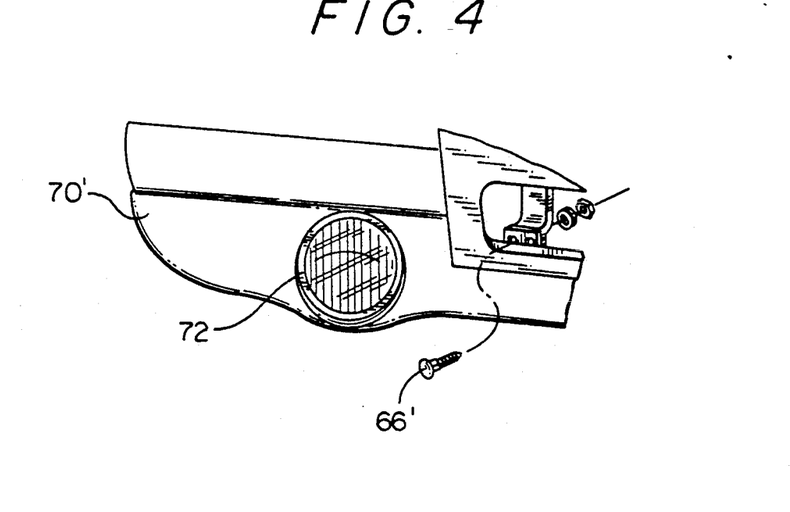
FIG. 4 is view of a portion of the front bumper of the truck of FIGS. 1-3, but illustrating another preferred embodiment.

FIG. 4 shows an alternate embodiment wherein the valence 70' is equipped with a fog light 72 and has an opening pre-formed therein for the passage of the bolt 66'. This is in contrast to opening 68 in valence 70 which is not always pre-formed and must sometimes be drilled during installation.

Again referring to FIG. 3, the lower flange 36 may have a general J configuration which will also allow for slight vertical positioning of the brush guard 30 as the assembly is tightened in position.

Upper and lower backing plates 74, 76 each have a first opening and are preferably positioned adjacent the middle portion 54 of the rear bracket 44 with the opening in the upper backing plate 74 aligned with openings 46 and 56 and with the opening in the lower backing plate 76 aligned with the lower openings 48 and 58. The backing plates 74, 76 add reinforcement in the area of the connecting bolts. Each of the backing plates 74, 76 may be a simple flat plate or may be a C-shaped channel member.

Because alignment of the brush guard 30 is critical to proper operation of the hood and headlights, it is preferred that each of the openings in the flanges, bracket members and backing plates be paired with a second opening horizontally displaced along the front of the truck. Such dual openings make alignment easier to achieve and produce stronger connections less susceptible to vibration.

Again referring to FIG. 2, the brush guard 30 has a grill guard assembly 80 and a brush guard assembly 82 that attaches to the grill guard assembly 80 with bolts 84 or the like. A gasket 86 is preferably fitted between the brush guard assembly 82 and grill guard assembly 80. The brush guard assembly 82 includes a rod or tube arranged in a curved configuration extending from the front bumper 22 upward slightly above the hood, then horizontally a distance and downward to the front bumper 22. There may also be one or more crossbar members. The grill guard assembly 80 extends laterally on either side of the brush guard assembly 82 slightly beyond the width of the truck curving rearward toward the sides of the truck. The grill guard assembly 80 has openings for the headlights. When properly installed, the brush guard assembly 82 does not interfere with opening or closing of the hood and the grill guard assembly 80 does not hinder operation of the headlights.

Figure 5:
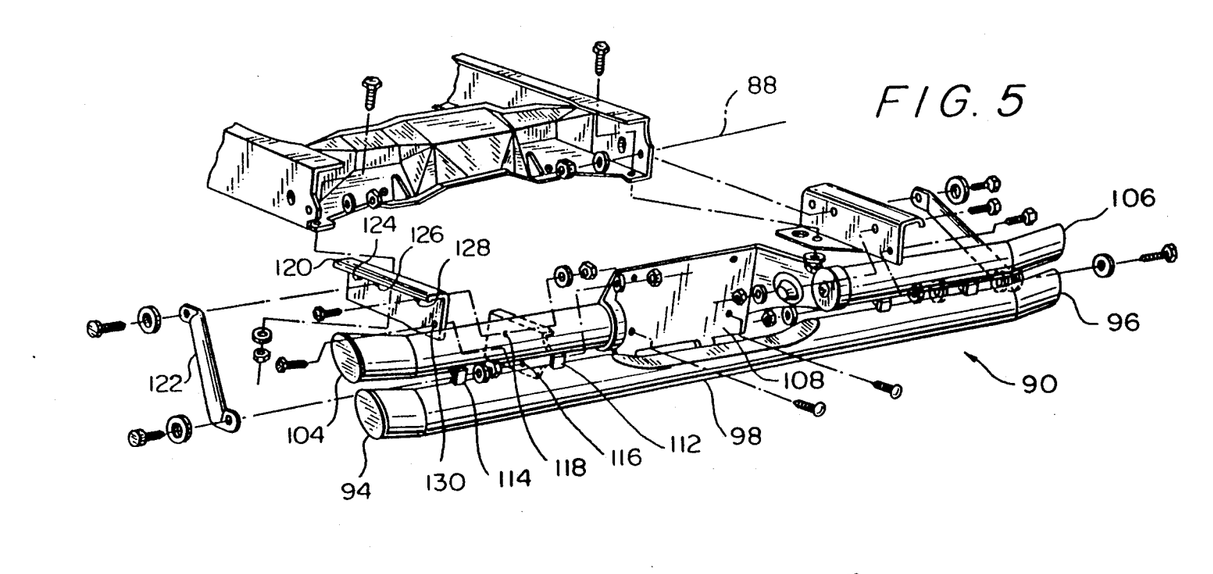
FIG. 5 is an exploded view of the pickup truck of FIG. 1 illustrating a preferred embodiment of a rear bumper assembly according to the present invention.
Figure 6:
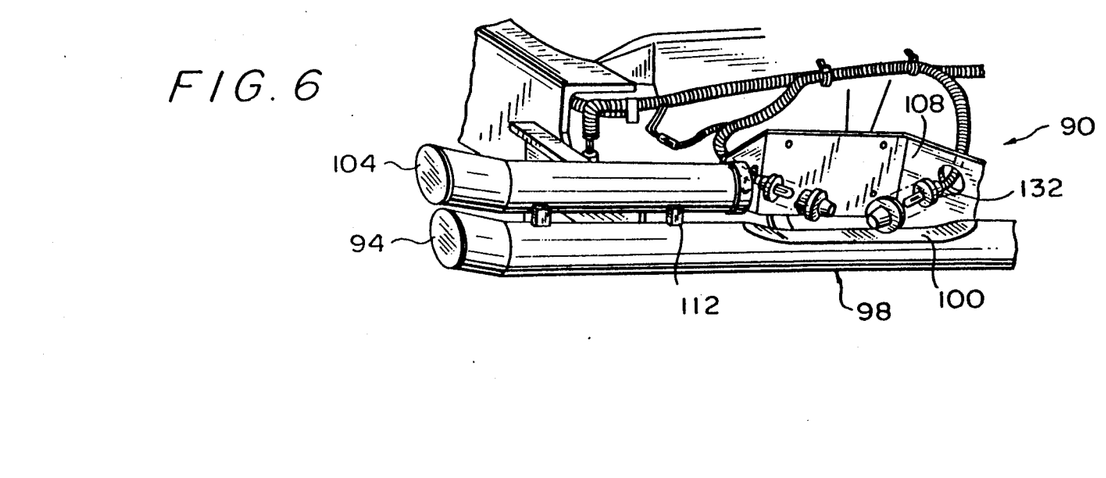
FIG. 6 is rear view of the assembled rear bumper of FIG. 5.
Figure 7:
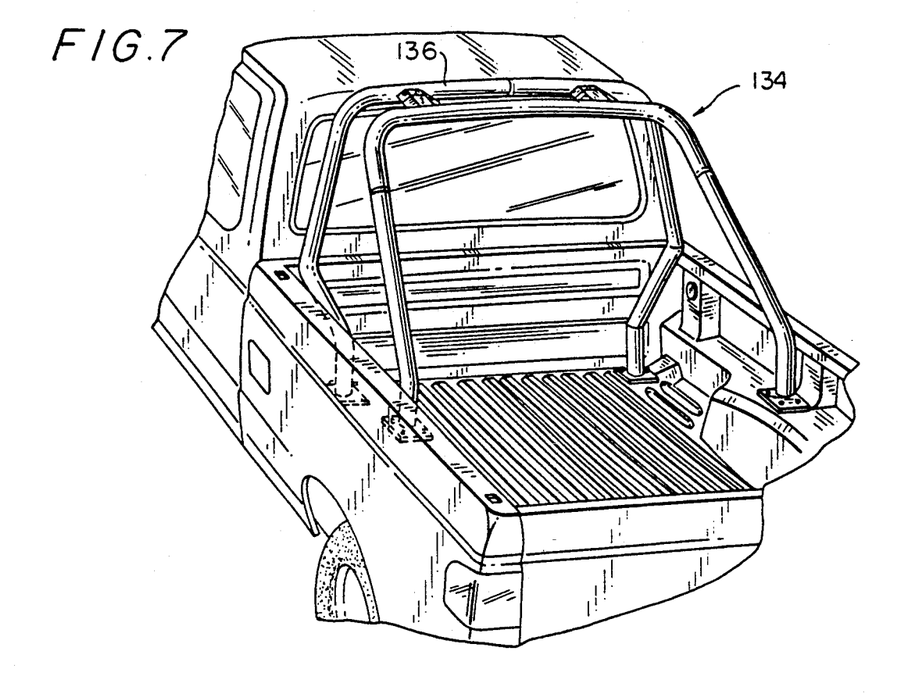
FIG. 7 is a rear view of the pickup truck illustrating the rally bars.

Referring to FIGS. 5-6, the truck has a rear bumper assembly 90 attached to the frame 12 which includes a first bumper tube 92 that has first and second end portions 94, 96 angling inward toward the truck body 14. A middle portion 98 is intermediate the end portions 94, 96 and is shown with a recessed or indented portion 100. A second tube 102 is mounted atop the first tube 92 and has first and second end portions 104, 106 angling inward toward the truck body. The ends of the tubes are capped and angled to provide a flat surface parallel to the sides of the truck.

The upper tube 102 also has a middle portion 108 intermediate the first and second end portions 104, 106 which is a flattened area of a size and configuration sufficient for mounting a license plate and actually forms a license plate mounting bracket 110. The bracket 110 may extend into the recessed middle portion 100 of the lower tube 92.

The rear bumper assembly 90 also includes a large bumper tab 112 fastened to the upper and lower tubes 102, 92, preferably by welding or the like. The large tab 112 has first and second mounting holes 116, 118. There is also a small bumper tab 114 fastened to the tubes 92, 102 and is positioned between the large tab 112 and the end portions of the tubes. The small tab 114 is thus positioned outboard of the large tab 112. The small tab 114 adds stability to the union of upper and lower tubes while the large tab 112 not only adds stability to the assembly but facilitates mounting the bumper assembly 90 onto the frame 12 of the truck.

The rear bumper assembly 90 also includes an inverted L-shaped frame bracket 120 and a tube bracket 122 for joining the tubes 92, 102 to the frame 12. The frame bracket 120 has first and second openings 124, 126 in the long leg of the L for attaching the bracket 120 to a vertical side member of frame 12. The openings 124, 126 mate with openings in the frame 12 so that the frame bracket 120 is offset downwardly of the horizontal centerline 88 of the frame 12. The offset is useful for mounting the bracket 120 and bumper 90 so that the tailgate opens and closes without interference. The bracket 120 also has third and fourth openings 128, 130 for attaching the bracket 120 to the large bumper tab 112. The tube bracket 122 has an opening on one end for attachment to the frame 12 via one of the first and second frame bracket openings 124, 126, and it has an opening on the other end for attachment to the small bumper tab 114. Bolts with lock washers are preferably used to fasten the tube bracket, frame bracket and tubes together. While only one set of tabs and brackets has been described it is to be understood that there are preferably at least two sets of tabs and brackets equally spaced from the centerline of the truck.

Referring now to FIG. 6, provision is made for illuminating a license plate. Openings are provided in the middle portion of the upper tube 92 through which wires and wires and lighting fixtures may be inserted.

As illustrated, there is a light socket 132 on either side of the license plate bracket 108.

Figure 8:
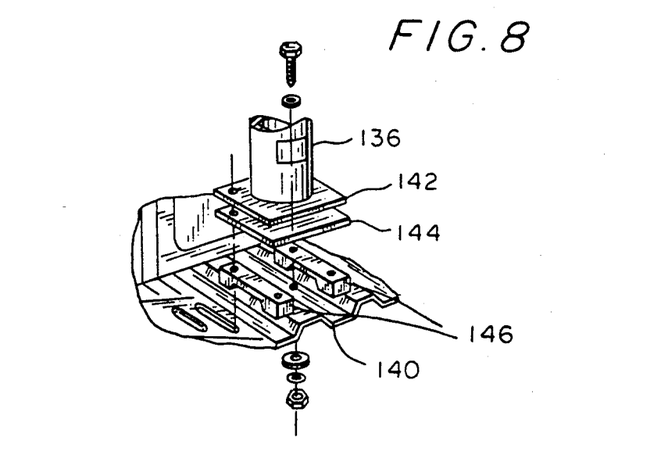
FIG. 8 is an exploded view illustrating connecting the front rally bar to the truck bed.

Referring to FIGS. 7-11, a rally bar assembly 134 includes front and rear rally bars 136, 138. The front rally bar 136 has a top portion extending parallel to the top of the cab of the truck, and left and right side portions extending downward from the top portion to the floor 140 of the truck bed. FIG. 8 illustrates the connection of the front rally bar 136 to the floor 140. Connection is made via a base plate 142 with a plurality of openings which are alignable with openings in the floor 140. Bolts or other fasteners extend through the base plate openings and floor 140 for making a connection. Inserted between the base plate 142 and floor 140 are a gasket 144 and spacers 146 which compensate for differences in the contour of the floor 140. As is evident, the spacers 146 are particularly useful when the floor 140 is corrugated. Each end of the front rally bar is similarly connected to the floor.

Figure 9:
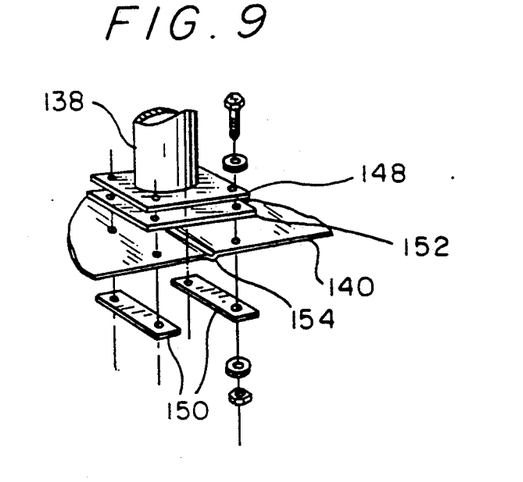
FIG. 9 is an exploded view illustrating connecting the rear rally bar to the truck wheel well.

The second rally bar 138 also has a top portion extending parallel to the top portion of the front rally bar 136 and left and right side portions extending downward to the truck bed. Preferably the left and right portions of the rear rally bar 138 are connected to the wheel wells in the truck bed. FIG. 9 illustrates the connection wherein the rear bar 138 has a base plate 148 with a plurality of openings alignable with openings in the wheel well. Bracing plates 150 are used on the underside of the wheel well 140 for receiving bolts or other fasteners to connect base plate 148 to the wheel well 140. A gasket 152 is positioned between the base plate 148 and floor of the wheel well 140. Preferably, the base plate 148 is centered over the wheel well character line 154.

Figure 11:
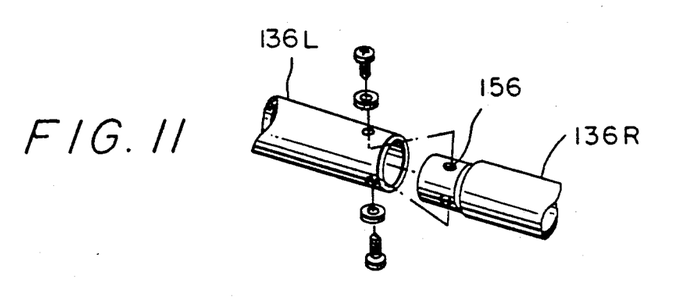
FIG. 11 is an exploded view illustrating connecting two segments of a rally bar.
Figure 12:
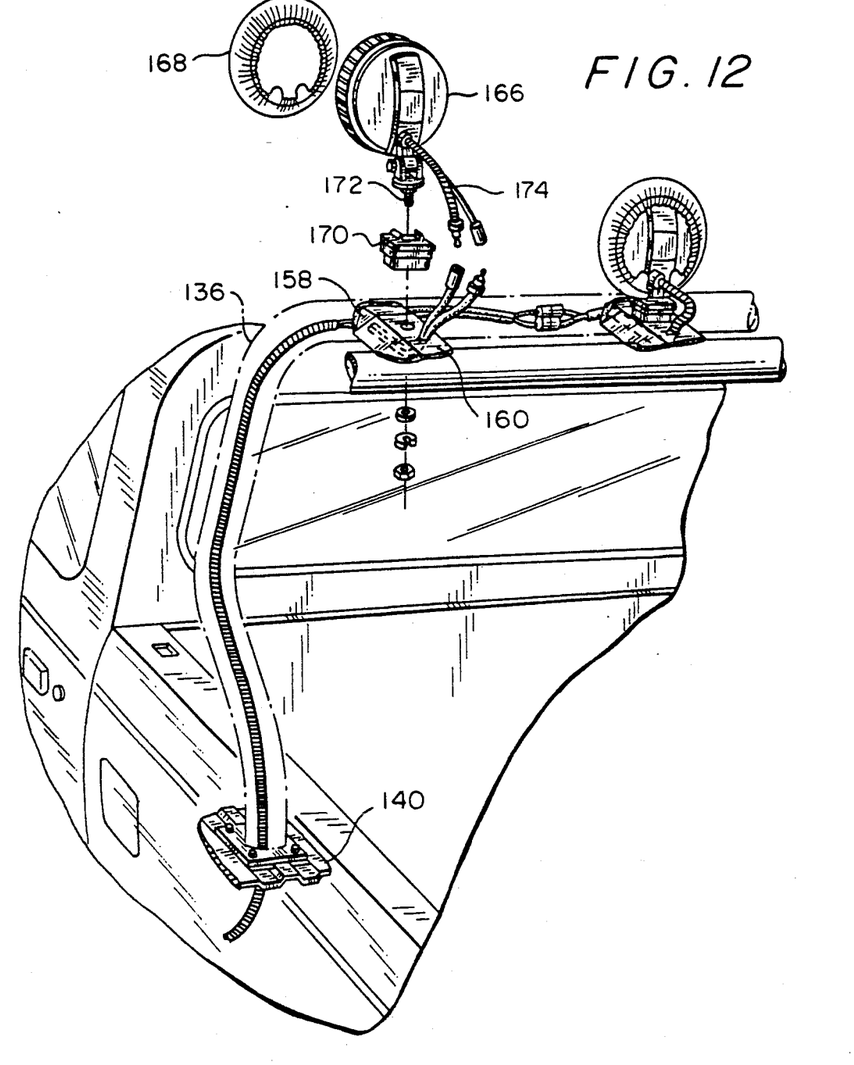
FIG. 12 is a rear view of the truck illustrating rally bar lights.

As illustrated in FIG. 11, the rally bars 136, 138 are not one continuous piece of tubing but several pieces joined together by Lapp joints. As illustrated, the left portion of rally bar 136L overlaps the right portion 136R of rally bar 136. A weld nut is preferably located on the undercut portion of the rally bar 136R so that the overlapping rally bar 136L can be secured thereto with a threaded member. By this construction, several pieces of rally bar tubing can be given any desired shape and assembled to achieve a final shape. Also, one set of bars can be arranged to fit both a six foot truck bed and an eight foot truck bed.

Figure 10:
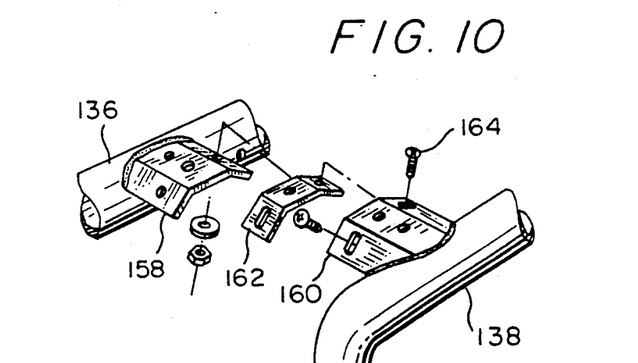
FIG. 10 is an exploded view of the bracket connecting the front and rear rally bars.

Referring now to FIG. 10, a first bracket member 158 is attached to the front rally bar 136 and extends rearward toward the second rally bar 138. A second bracket member 160 is attached to the rear rally bar 138 and extends forward toward the front rally bar 136. Each bracket member 158, 160 is preferably connected to its rally bar by welding or the like, and each bracket member 158, 160 has a center member with end members attached thereto at angles giving the bracket a general C cross section. The brackets 158, 160 preferably nest so that the rear bracket 160 overlays the front bracket 158. A gasket 162 is positioned between the front and rear bracket members 158, 160. Mounting holes or slots to allow adjustment are formed in the bracket members and gasket for receiving releasable fasteners, such as bolts 164. Fastening the rally bar members 136, 138 together increases the stability of the rally bar unit.

Referring now to FIGS. 12-15, an accessory lighting fixture 166 is attached to the front and rear bracket members 158, 160. The lighting fixture 166 faces the front of the truck to direct a beam of light forward of the truck. A lens cover 168 covers the face of the fixture 166 when not in use. It is desirable to cover the fixture to keep it clean, to prevent reflected glare from headlights and to prevent damage to the lens of the fixture. A mounting bracket cover 170 has an opening therethrough and is positioned on the bracket members 158, 160 with holes aligned for receiving an attaching end 172 of the fixture 166. The connecting end 172 is preferably threaded to be secured using a nut and lock washer.

Figure 13:
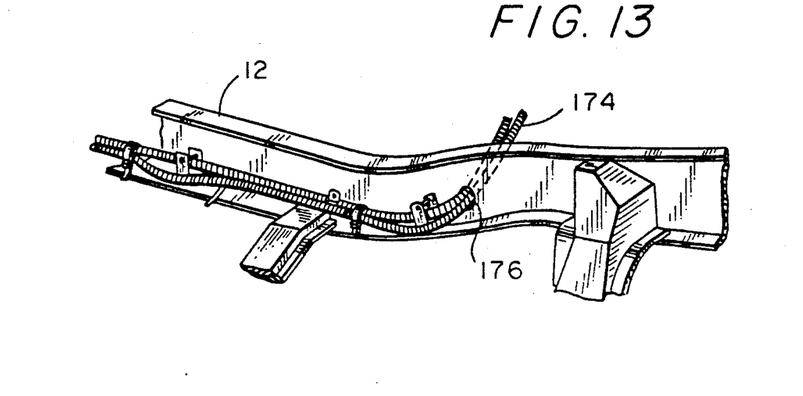
FIG. 13 is a diagrammatic view showing routing of wiring along the frame for rally bar lights.
Figure 14:
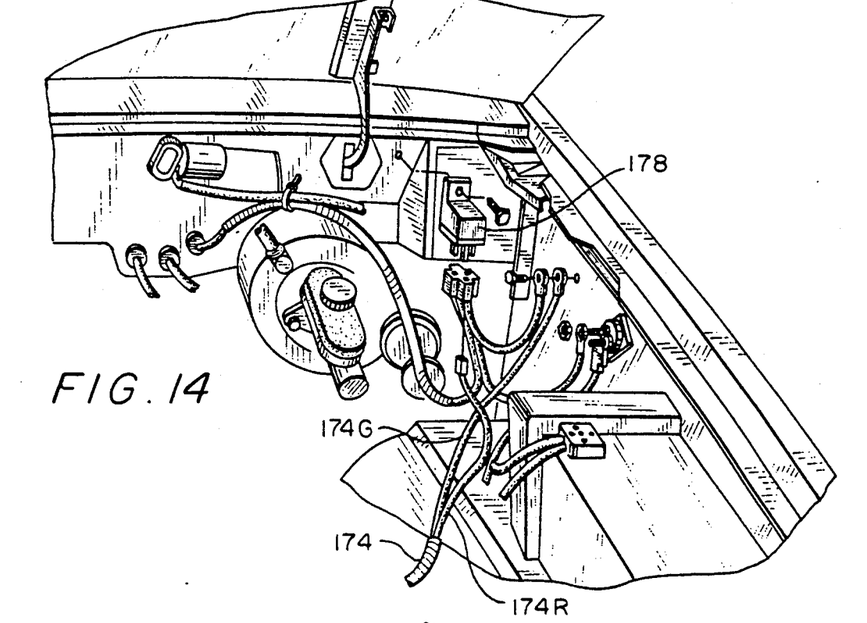
FIG. 14 is a diagrammatic view showing routing of wiring in the engine compartment for rally bar lights.
Figure 15:
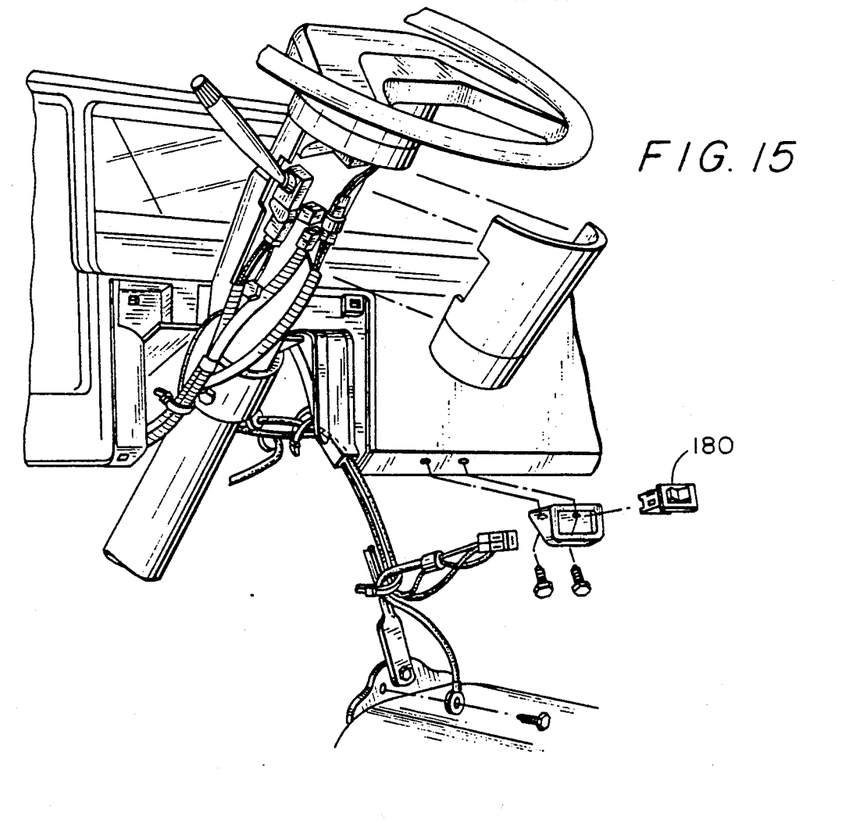
FIG. 15 is a diagrammatic view showing routing of wiring and controls in the passenger compartment for rally bar lights.

The wiring 174 necessary for operation is routed through an opening in the front and rear mounting brackets 158, 160 and an opening in the front rally bar 136. The wiring 174 is routed through an opening in the floor of the truck bed and an opening 176 in the frame 12 (FIG. 13). The wiring continues along the frame 12 and enters the engine compartment of the truck where a ground wire 174G is secured to the grounding system of the truck while the hot wire 174R is connected to an offroad relay connector 178 which is part of the truck's relay harness wiring (FIG. 14). From connector 178, the wiring enters the cab where it is connected to a rocker switch 180 for controlling on and off operation of the fixture 166.

It can now be appreciated that accessories for a pickup truck have been presented which enhance appearance while providing a useful function. The brush/grill guard assembly attaches to the front bumper with offset brackets. The offset in the brackets adapts the brackets to various ranged front bumpers whose flanges are not vertically aligned and helps insure the vertical position of the brush/grill guard is as desired. Dual mounting holes and slots foster easy alignment of the assembly so that the headlights and hood operate normally. The mounting brackets add rigidity to the structure reduce the possibility of bolts and other fasteners working loose during normal use. Because the mounting brackets sandwich flanges on the front bumper, the brackets can be effectively used with both metallic and nonmetallic bumpers.

Installation and operation of the front brush/grill assembly is believed to be apparent from the foregoing description and drawings, but a few words will be added for emphasis. Installation is most easily accomplished by a team of two installer. The front and rear mounting brackets and the backing plates are loosely assembled about the front bumper flanges. The brush/grill assembly is fastened to the top of the mounting brackets but not tightened at this point. The brush/grill assembly is next centered on the front of the truck, taking care to gauge spacing around the headlights. The height of the brush/grill assembly is adjusted to ensure that the headlights are centered and that clearance is provided between the top of the bumper and grill guard. At this point, the fasteners extending therethrough the mounting brackets and backing plates are tightened. Spacing to the front of the truck is now adjusted so that there is clearance between the front edge of the hood and top of the guard assembly. The fasteners extending through the top of the mounting brackets are tightened to complete the assembly. When so installed, the brush/grill assembly diverts brush from the grill which is very useful during off the road truck use.

The accessory rear tubular bumper for the pickup truck has capped, slanted ends for aesthetic appeal. The rear bumper assembly has first and second tubes with angled end portions which angle inward toward the truck body. The ends of the tubes are parallel to the truck body for aesthetic appeal. The tubes provide a license plate mounting area and are mounted using large and small bumper tabs, a frame bracket and a tube bracket. Installation is accomplished by attaching the frame brackets to the truck frame. After hand tightening, the tube braces are attached to the frame and frame brackets and also hand tightened. A check is made for adequate tailgate clearance before finally tightening the frame brackets and tube braces. The wiring is then routed through the openings provided.

The accessory rally bar with lights features preshaped tubular segments which closely follow the contour of the cab and adjust to fit both six foot and eight foot truck beds. The wiring for the lights runs along the vehicle frame and up through the rally bar tubes so that the wiring is protected inside the tube. The rally bar assembly includes front and rear rally bars releasably connected by a two member bracket that also supports the light assembly which projects light forward of the vehicle. The bracket has a front member permanently fastened to the front rally bar and a rear member permanently fastened to the rear rally bar.

While the invention has been described with reference to a pickup truck it is apparent that the invention is easily adapted to other types of trucks that have the requisite bumper, frame and body for attachment. While the invention has been described with particular reference to a preferred embodiment, it will be understood by those skilled in the art that various changes may be made and equivalents may be substituted for elements of the preferred embodiment without departing from invention. For example, the brush guard has been described as being constructed of metal such as aluminum or steel, but composite metals and high strength nonmetals, such as high density resins or copolymer materials, may also be used. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, while the braces and brackets for connecting the rear bumper are shown for rigid connection, the offset bracket may also be used where the bumper is resiliently mounted. It is accordingly intended that the claims shall cover all such modifications and applications as do not depart from the true spirit and scope of the invention.

What is claimed is:

1. A guard and bumper assembly for a truck front bumper having a front surface, an upwardly extending lower flange positioned behind said front surface, and a downwardly extending upper flange positioned behind said front surface, said guard assembly comprising:

a brush guard having an upper flange with an opening and a lower flange with an opening;

a front mounting bracket having an upper end portion with an opening and being positionable between said upper flange and said front surface, and a lower end portion with an opening and being positionable between said lower flange and said front surface; and a rear mounting bracket having an upper end portion with an opening, a lower end portion with an opening and a middle portion intermediate said upper and lower end portions, said middle portion having an upper opening alignable with said opening of said upper end portion of said front mounting bracket and a lower opening alignable with said opening of said lower end portion of said front mounting bracket to thereby sandwich said upper and lower flanges between said front and rear mounting brackets, said upper and lower end portion openings being respectively alignable with said upper and lower flange openings of said brush guard for mounting said brush guard on said rear bracket.

2. A guard and bumper assembly, as set forth in claim 1, wherein said front bumper includes a valence with an opening therein alignable with said opening in said lower end portion of said rear mounting bracket.

3. A guard and bumper assembly, as set forth in claim 1, wherein said upper brush guard flange has first and second portions forming an angle of about 140 to 180 degrees.

4. A guard and bumper assembly, as set forth in claim 1, wherein said upper end portion of said rear mounting bracket extends away from said front surface horizontally so that said opening in said upper end portion of said rear mounting bracket opens vertically while said opening in said lower end portion of said rear mounting bracket opens horizontally.

5. A guard and bumper assembly, as set forth in claim 1, wherein said front bracket has said lower end portion horizontally offset from said upper end portion.

6. A guard and bumper assembly, as set forth in claim 1, wherein said opening in said upper end portion of said rear mounting bracket is a slot and said upper end portion of said rear mounting bracket extends away from said front surface horizontally so that said slot extends horizontally and opens vertically while said opening in said lower end portion of said rear mounting bracket opens horizontally to respectively cooperate with said upper and lower brush guard flange openings to vertically and horizontally orient said brush guard relative to said truck body, respectively.

7. A guard and bumper assembly, as set forth in claim 1, including a backing plate having an opening and being positioned rearwardly of said rear mounting bracket with said backing plate opening aligned with one of said openings in each of said front and rear mounting brackets.

8. A guard and bumper assembly, as set forth in claim 1, including a lower backing plate having an opening and being positioned rearwardly of said rear mounting bracket with said backing plate opening aligned with said opening of said lower end portion of said front mounting bracket and said lower opening of said middle portion of said rear mounting bracket.

9. A truck, comprising:
a longitudinally extending frame;
a body mounted on said frame;
a front bumper having a front surface, an upwardly extending lower flange positioned between said front surface and said body, and a downwardly extending upper flange positioned between said front surface and said body;
a brush guard having an upper flange with a first opening and a lower flange with a first opening;
a front mounting bracket having an upper end portion with a first opening and being positioned between said upper flange and said front surface, and a lower end portion with a first opening and being positioned between said lower flange and said front surface; and
a rear mounting bracket having an upper end portion with a first opening, a lower end portion with a first opening and a middle portion intermediate said upper and lower end portions, said middle portion having a first upper opening aligned with said opening of said upper end portion of said front mounting bracket and a lower opening aligned with said opening of said lower end portion of said front mounting bracket to thereby sandwich said upper and lower flanges between said front and rear mounting brackets, said upper and lower end portion first openings being respectively aligned with said upper and lower flange first openings of said brush guard for mounting said brush guard on said rear bracket.

10. A truck, as set forth in claim 9, wherein each of said first openings is paired with a second opening horizontally displaced from said first opening.

11. A truck, as set forth in claim 9, wherein said front bumper includes a valence with a first opening therein aligned with said first opening in said lower end portion of said rear mounting bracket.

12. A truck, as set forth in claim 9, wherein said front bracket has said lower end portion horizontally offset from said upper end portion.

13. A truck, as set forth in claim 9, wherein said upper end portion of said rear mounting bracket bends toward said truck body at an angle of about 90° so that said first opening in said upper end portion of said mounting bracket opens vertically while said first opening in said lower end portion of said rear mounting bracket opens horizontally.

14. A truck, as set forth in claim 9, wherein said first opening in said upper end portion of said rear mounting bracket is a first slot and said upper end portion of said rear mounting bracket bends toward said truck body at an angle of about 90° so that said first slot extends horizontally and opens vertically while said first opening in said lower end portion of said rear mounting bracket opens horizontally to respectively cooperate with said upper and lower brush guard flange first openings to vertically and horizontally orient said brush guard relative to said truck body.

15. A truck, as set forth in claim 9, including a backing plate having a first opening and being positioned between said truck body and said rear mounting bracket with said first backing plate opening aligned with one of said openings in said front and rear mounting brackets.

16. A truck, as set forth in claim 9, including a lower backing plate having a first opening and being positioned between said truck body and said rear mounting bracket with said lower backing plate first opening aligned with said first opening of said lower end portion of said front mounting bracket and said lower opening of said middle portion of said rear mounting bracket.

17. A truck, as set forth in claim 9, including a rally bar assembly comprising:
a first rally bar having a top portion and being connected to said body;
a second rally bar having a top portion and being connected to said body;
a first bracket member having an opening and being permanently fastened to said first rally bar;
a second bracket member having an opening and being permanently fastened to said second rally bar; and means, extending through said bracket openings, for releasably fastening said first and second bracket members.

18. A truck, as set forth in claim 17, including a lamp holder attached to said first and second bracket members.

19. A truck, as set forth in claim 9, including a rear bumper assembly comprising:

a first tube having first and second end portions angling inward toward said truck body and a middle portion intermediate said first and second end portions;

a second tube mounted atop said first tube having first and second end portions angling inward toward said truck body and a middle portion intermediate said first and second end portions;

a license plate mounting bracket formed in said middle portion of said second tube overlying said middle portion of said first tube;

a large bumper tab fastened to said middle portions of said first and second tubes;

a small bumper tab fastened to said first and second tubes and positioned between said large tab and said end portions of said tubes;

a frame bracket having first and second openings for attaching said bracket to said frame and third and fourth openings for attaching said bracket to said large bumper tab; and a tube bracket having an opening on one end for attachment to said frame via one of said first and second frame bracket openings and having an opening on the other end for attachment to said small bumper tab.

20. A truck, as set forth in claim 19, wherein said truck frame has a horizontal centerline and said frame bracket is positioned below said centerline.

* * * * *